UNITED STATES PATENT OFFICE.

JOSEPH OLMSTED, OF PROVIDENCE, RHODE ISLAND, ASSIGNOR, BY MESNE ASSIGNMENTS, TO THE WESTERN ELECTRIC MANUFACTURING COMPANY, OF CHICAGO, ILLINOIS.

IMPROVEMENT IN INSULATING TELEGRAPH-WIRES.

Specification forming part of Letters Patent No. 129,858, dated July 23, 1872; reissue No. 6,955, dated February 29, 1876; application filed December 22, 1875.

DIVISION B.

*To all whom it may concern:*

Be it known that I, JOSEPH OLMSTED, of the city and county of Providence, and State of Rhode Island, have invented a new and useful Improvement in Insulating Telegraph-Wires, of which the following is a specification:

The method of insulating now in use consists in braiding over the wires a fibrous covering, after which it is dipped in wax, for the purpose of filling and closing its pores, and, after a subsequent scraping to remove the surplus wax, it is ready for use. This method is, however, objectionable, inasmuch as it leaves the covering in a very rough and soft condition, and fails to secure perfect insulation.

In my improved method, after the wire has received its coating I dip it in paraffine or wax, after which, instead of scraping off the surplus coating, I pass the whole through a suitable machine, which compresses the covering, and forces the paraffine or wax into the pores, and secures perfect insulation. By so compressing the covering the paraffine or wax is forced into the pores, and the surface becomes and appears polished.

Wire insulated in this manner is entirely impervious to the atmosphere, of greater durability, and less cumbersome than any heretofore made.

Having thus described my invention, what I claim as new, and desire to secure by Letters Patent, is—

An insulated telegraph-wire the covering of which has its pores filled and its surface polished, substantially as described.

JOSEPH OLMSTED.

Witnesses:
THOMAS C. CONNOLLY,
WARREN I. COLLAMER.